United States Patent
Huang et al.

(10) Patent No.: US 10,056,019 B2
(45) Date of Patent: Aug. 21, 2018

(54) TOUCH DISPLAY PANEL AND TEST METHOD FOR TESTING SHORT CIRCUIT OR OPEN CIRCUIT

(71) Applicant: InnoLux Corporation, Miao-Li County (TW)

(72) Inventors: Sheng-Feng Huang, Miao-Li County (TW); Chien-Feng Shih, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 76 days.

(21) Appl. No.: 15/167,897

(22) Filed: May 27, 2016

(65) Prior Publication Data

US 2016/0358525 A1    Dec. 8, 2016

(30) Foreign Application Priority Data

Jun. 8, 2015    (TW) .............................. 104118458 A

(51) Int. Cl.
| | |
|---|---|
| *G01R 31/26* | (2014.01) |
| *G09G 3/00* | (2006.01) |
| *G06F 3/041* | (2006.01) |
| *G06F 3/044* | (2006.01) |
| *G09G 3/36* | (2006.01) |

(52) U.S. Cl.
CPC .............. *G09G 3/006* (2013.01); *G06F 3/044* (2013.01); *G06F 3/0412* (2013.01); *G09G 3/3655* (2013.01); *G09G 2300/0426* (2013.01); *G09G 2330/12* (2013.01)

(58) Field of Classification Search
CPC ...... G09G 3/20; G09G 3/3225; G09G 3/3648; G09G 3/3659; G06F 3/044; G06F 3/0412; G06F 3/0416
See application file for complete search history.

(56) References Cited

U.S. PATENT DOCUMENTS

| | | | |
|---|---|---|---|
| 2007/0170949 A1* | 7/2007 | Pak ......................... | G09G 3/006 324/760.01 |
| 2008/0074137 A1* | 3/2008 | Kim .................... | G02F 1/13458 324/750.3 |
| 2009/0273753 A1* | 11/2009 | Park ....................... | G09G 3/006 349/152 |

FOREIGN PATENT DOCUMENTS

CN    104536609    4/2015

OTHER PUBLICATIONS

Chinese language office action dated Jun. 17, 2016, issued in application No. TW 104118458.

* cited by examiner

*Primary Examiner* — Minh N Tang
(74) *Attorney, Agent, or Firm* — McClure, Qualey & Rodack, LLP

(57) ABSTRACT

The invention provides a touch display panel, including: a lower substrate where a common electrode layer, a first test pad, and a second test pad are formed, an upper substrate disposed above the common electrode layer, a liquid crystal layer sandwiched between the upper substrate and lower substrate, wherein the common electrode layer is divided into a plurality of common electrode blocks arranged in a matrix, and any two adjacent common electrode blocks of the plurality of common electrode blocks are coupled to the first test pad and the second test pad, respectively.

12 Claims, 10 Drawing Sheets

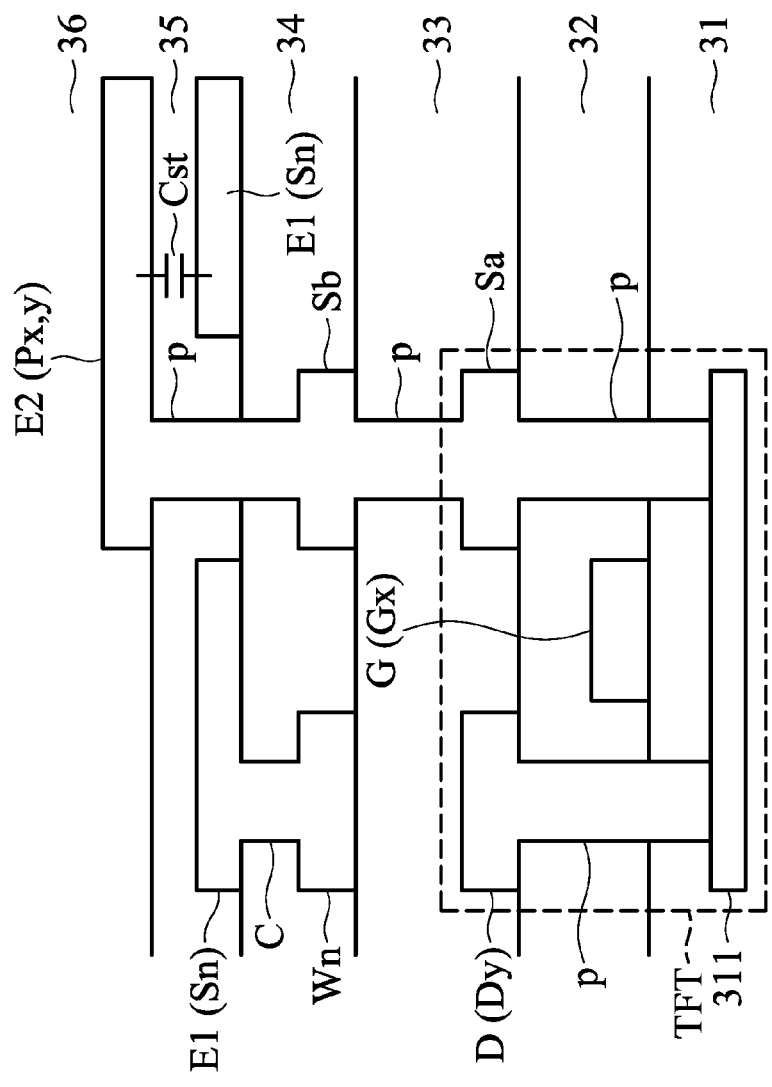
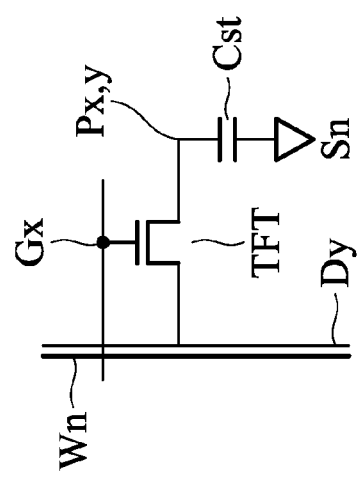
FIG. 3B
FIG. 3A

TOUCH DISPLAY PANEL AND TEST METHOD FOR TESTING SHORT CIRCUIT OR OPEN CIRCUIT

CROSS REFERENCE TO RELATED APPLICATIONS

This Application claims priority of Taiwan Patent Application No. 104118458, filed on Jun. 8, 2015, the entirety of which is incorporated by reference herein.

BACKGROUND OF THE INVENTION

Field of the Invention

The present invention relates to a touch display panel, and in particular to a test method of the touch display panel capable of testing whether common electrode blocks are short-circuited or open-circuited and discharging pixel electrodes.

Description of the Related Art

The touch display panel means a display panel incorporated with touch function without a touch panel disposed on the touch panel. For example, a LCD panel or an OLED panel is incorporated with a touch function and called an in-cell touch display panel. Under this structure, the touch function is usually performed by utilizing the existing electrodes of the display panel. Thus, additional structures with touch function are not necessary. For example, if the in-cell touch display panel is a fringe field switching (FFS) type LCD panel, generally the common electrode is divided into a plurality of blocks operating as touch sensing electrodes.

A basic structure of the FFS type LCD panel is shown in FIG. 1. The FFS type LCD panel 10, from bottom to top, includes a lower polarizer 11, a lower substrate 12, a thin film transistor layer 13, a liquid crystal layer 14, an alignment layer 15, a color filter layer 16, an upper substrate 17, and an upper polarizer 18. The thin film transistor layer 13 further includes pixel electrodes 131, an insulating layer 132, a common electrode 133, and an alignment layer 134. When the pixel electrode 131 is supplied with voltage, an electric field is generated between the pixel electrode 131 and the common electrode 133. The generated electric field controls liquid crystal molecules spinning in the horizontal direction to adjust the gray level of the displaying image. In addition, a shielding layer can be disposed at a side of the color filter 16 facing the upper polarizer 18.

The common electrode of an usual FFS type LCD panel is an entire plane as the common electrode 133 shown in FIG. 1. In the touch display panel, the common electrode is divided into a plurality of electrode blocks. Each electrode block still operates as a common electrode during the display period, and operates as a touch sensing electrode during the touch sensing period to sense capacitance generated between the touch sensing electrode and an external touch object to determine the location of the touch object.

The plurality of electrode blocks divided from the common electrode have to be insulated to each other, so that the electrode blocks can separately detect the touch location. Therefore, each electrode block should be tested whether it is insulated to the others and operates normally before the touch display panel is assembled.

BRIEF SUMMARY OF THE INVENTION

A detailed description is given in the following embodiments with reference to the accompanying drawings.

To solve the aforementioned problems, the invention provides a touch display panel and a test method thereof capable of testing whether the common electrode blocks are short-circuited or open-circuited and discharging pixel electrodes.

The invention provides a touch display panel, including: a lower substrate where a common electrode layer, a first test pad, and a second test pad are formed, an upper substrate disposed above the common electrode layer, a liquid crystal layer sandwiched between the upper substrate and the lower substrate, wherein the common electrode layer is divided into a plurality of common electrode blocks, and any two adjacent common electrode blocks of the plurality of common electrode blocks are coupled to the first test pad and the second test pad, respectively.

In the touch display panel, the plurality of common electrode blocks are arranged in a matrix.

In the touch display panel, a first control pad and a plurality of first switch elements are formed on the lower substrate, wherein at least one of the plurality of first switch elements is coupled between one of the common electrode blocks and one of the first test pad and the second test pad, and the first control pad is connected to control terminals of the plurality of first switch elements.

In the touch display panel, a plurality of data lines, a second control pad and a plurality of second switch elements are formed on the lower substrate, wherein at least one of the plurality of data lines is connected to one of the first test pad and the second test pad via one of the plurality of the second switch elements, and the second control pad is connected to control terminals of the plurality of second switch elements.

In the touch display panel, an area of the lower substrate protrudes with respect to an edge of the upper substrate, and the first test pad, the second test pad, and the first control pad are formed on the area of the lower substrate.

In the touch display panel, the common electrode block is a quadrilateral and the length of each side of the quadrilateral is 1 mm~5 mm.

In the touch display panel, the upper substrate is a color filter substrate and the lower substrate is a thin film transistor substrate.

According to another aspect of the invention, the invention provides a touch panel including: a lower substrate where a common electrode layer is formed, an upper substrate disposed above the common electrode layer, a liquid crystal layer sandwiched between the upper substrate and the lower substrate, wherein the common electrode layer is divided into a plurality of common electrode blocks in a matrix, and each of the plurality of common electrode blocks is separately coupled to a metal wire extending to an edge of the lower substrate.

According to another aspect of the invention, the invention provides a test method of a touch display panel, the touch display panel including: a plurality of pixel electrodes, a plurality of common electrode blocks, a first test pad and a second test pad, wherein any two adjacent common electrode blocks of the plurality of common electrode blocks are separately coupled to the first test pad and the second test pad, wherein the test method is a common electrode short circuit test method including: charging the plurality of pixel electrodes to the same voltage level, providing a first voltage level to the first test pad and a second voltage level not equal to the first voltage level to the second test pad so as to make the touch display panel show checkerboard pattern, and checking whether there are any two adjacent checks showing the same gray level in the checkerboard pattern.

In the test method, the touch display panel includes: a first control pad and a plurality of first switch elements, wherein anyone of the plurality of first switch elements is coupled between one of the common electrode blocks and one of the first test pad and the second test pad, and the first control pad is connected to control terminals of the plurality of first switch elements, and wherein the common electrode short circuit test method includes: providing a predetermined voltage level to the first control pad to turn on the plurality of first switch elements.

In the test method, the touch display panel includes: a plurality of data lines, a second control pad, and a plurality of second switch elements, wherein anyone of the plurality of data lines is connected to one of the first test pad and the second test pad via one of the plurality of the second switch elements, and the second control pad is connected to control terminals of the plurality of second switch elements, wherein the test method is a discharge method including: conducting the plurality of pixel electrodes with the plurality of data lines, providing a third voltage level to the first test pad and the test pad, and providing a predetermined voltage level to the first control pad and the second control pad to turn on the plurality of first switch elements and the plurality of second switch elements to discharge the plurality of pixel electrodes.

In the test method, the test method is a common electrode open circuit test method including: charging the plurality of pixel electrodes to the same voltage level, providing a fourth voltage level to the first test pad and the second test pad so as to make the touch display panel show an image with the same gray level, and checking whether there is any area with an abnormal gray level on the image.

According to the touch display panel and the test method thereof, whether the common electrode blocks are short-circuited or open-circuited can be tested and the pixel electrodes can be discharged.

BRIEF DESCRIPTION OF THE DRAWINGS

The present invention can be more fully understood by reading the subsequent detailed description and examples with references made to the accompanying drawings, wherein:

FIG. 3A is a circuit diagram showing a pixel in accordance with an embodiment of the invention;

FIG. 3B is a cross section showing the arrangement of the common electrode and the thin film transistor layer in accordance with an embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 2:
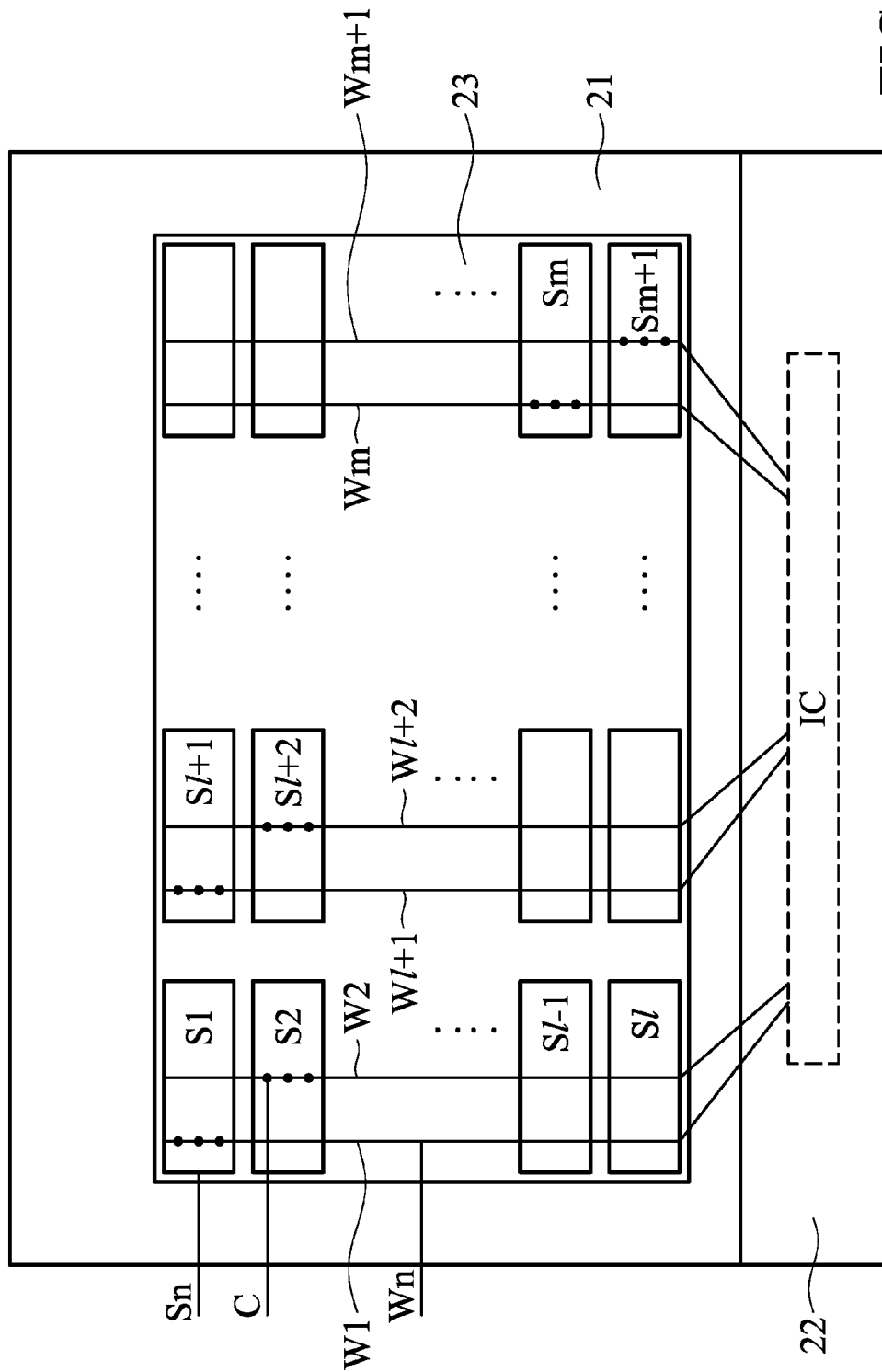
FIG. 2 is a top view of a touch display panel of the invention.

FIG. 2 is a top view of a touch display panel of the invention. As shown in FIG. 2, in a touch display panel 20, the area where the upper substrate overlaps the lower substrate is called an overlap area 21 in the specification. When a LCD panel is used as an example, the upper substrate is a color filter substrate and the lower substrate is a thin film transistor substrate. An area of the lower substrate protruding with respect to the upper substrate and not covered by the upper substrate is called an outer lead bonding (OLB) area 22 in the specification. A portion of the overlap area 21 is substantially used to display image and called a display area 23. As shown in FIG. 2, in the display area 23, a common electrode is divided into a plurality of common electrode blocks S1, S2, . . . , Sl, Sl+1, Sl+2, . . . , Sm, and Sm+1 arranged in a matrix. Any common electrode block Sn (n equals any integer from 1 to m+1) is polygon, for example a quadrilateral, a hexagon, etc, but not limited thereto. The invention gives an example wherein the common electrode block is a quadrilateral and the length of each side of the quadrilateral is 1 mm~5 mm. Each common electrode block Sn is connected with a metal wire Wn (n equals any integer from 1 to m+1) via at least one (for example, three) conductive contact portion C. The touch display panel of this embodiment is an in-cell touch display panel, and the display panel is an FFS type LCD panel. The common electrode is divided into a plurality of blocks operating as touch sensing electrodes. All of the metal wires Wn are connected to a control chip IC disposed on the OLB area 22. The control chip IC outputs common voltage level to all of the common electrode blocks Sn during the display period, and senses each common electrode block for capacitance variation to determine whether the touch operation is performed during the touch sensing period. Here, touch detection of an embodiment of the invention utilizes a self-capacitance detection method. Namely, whether a capacitance variation is generated between a common electrode block and a touch object (a finger or a touch pen) is detected so as to determine whether a touch event occurs. For example, when a touch object is close to a common electrode block, a capacitance is generated between the common electrode block and the touch object. The capacitance influences the speed of electric charging/discharging. Therefore, a controller can determine whether a touch event occurs according to the speed of electric charging/discharging.

Figure 1:
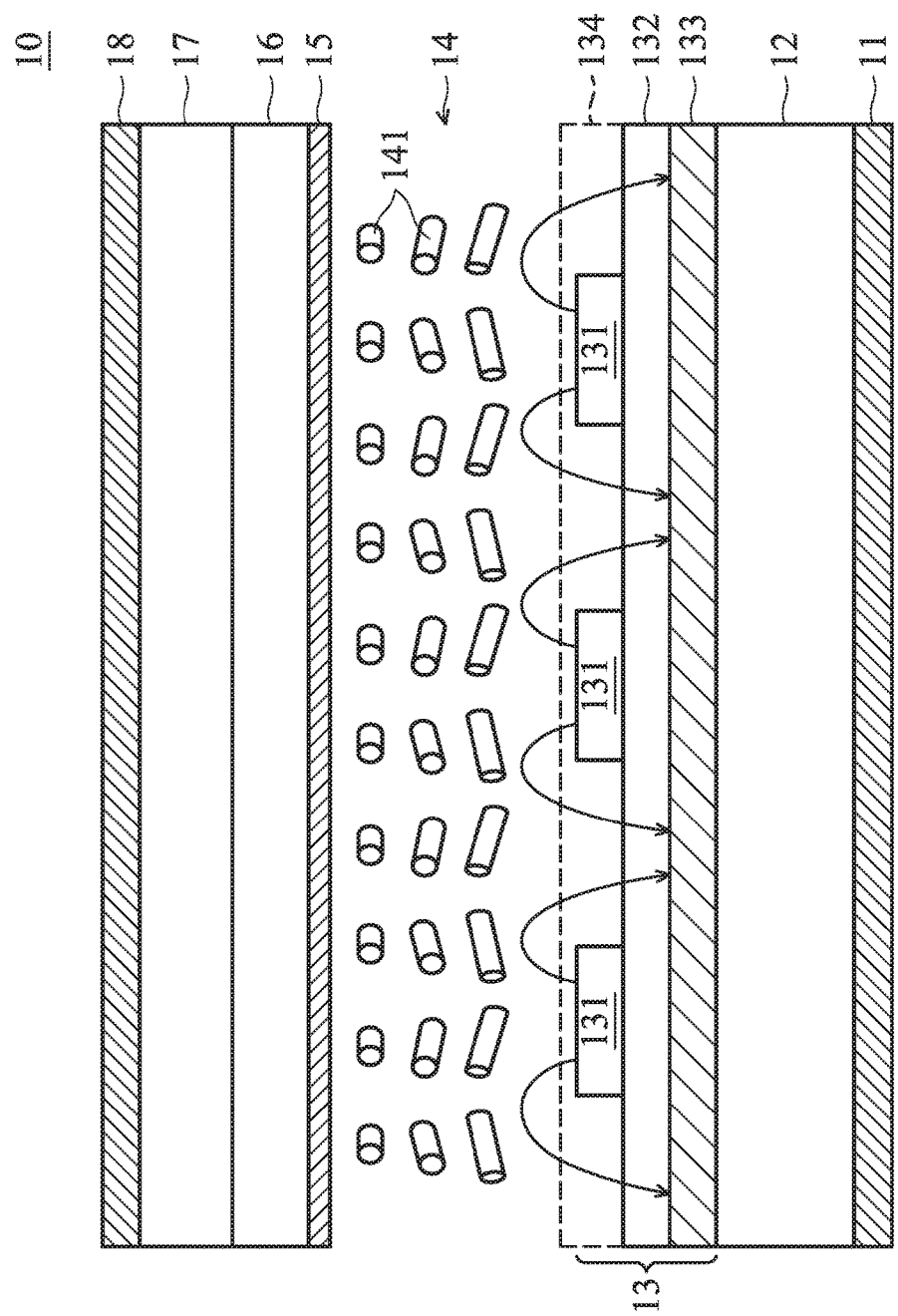
FIG. 1 is cross section of a conventional FFS type LCD panel.

To clearly understand the positions of the common electrode block Sn and each metal layer in the thin film transistor layer, FIG. 3A is a circuit diagram showing a pixel in accordance with an embodiment of the invention, and FIG. 3B is a cross section showing the arrangement of the common electrode and the thin film transistor layer in accordance with an embodiment of the invention. As shown in FIG. 3A, the circuit of a pixel includes a gate line Gx (x is a positive integer), a data line Dy (y is a positive integer), a thin film transistor TFT, a pixel electrode Px,y (x and y correspond to the x value of the gate line and the y value of the data line), and a common electrode Sn. The pixel Px, y and the common electrode Sn form a pixel capacitor Cst. Referring to FIG. 3B, the pixel electrode Px,y, the common electrode Sn, and the thin film transistor TFT are located at different layers respectively, forming a multilayer structure. This structure, from bottom to top, includes a gate dielectric layer 31, a gate cladding layer 32, interlayer insulating layers 33, 34, and 35, and an electrode cladding layer 36. The common electrode Sn and the metal wire Wn are formed in the interlayer insulating layers 34 and 35. The pixel electrode Px, y is formed in the electrode cladding layer 36. There is a semiconductor channel layer 311 in the gate dielectric layer 31 to form a channel of the thin film transistor TFT. A gate C coupled to the gate line Gx is formed on the gate dielectric layer 31 and covered by the gate cladding layer 32. A drain electrode pad D coupled to the data line Dy and a first source electrode pad Sa are formed on the gate cladding layer 32 and covered by the interlayer insulating layer 33 for planarization. Both of the drain electrode pad D and the first source electrode pad Sa are in contact with the semiconductor channel layer 311 via a conductive column p made of conductive material. The metal wire Wn and a second source electrode pad Sb are formed on the interlayer insulating layer 33 and covered by the interlayer insulating layer 34. The second source electrode pad Sb is connected to the first source electrode pad Sa via the conductive column p. A transparent electrode El acting as the common electrode Sn is formed on the interlayer insulating layer 34 and covered by the interlayer insulating layer 35. The transparent electrode E1 is connected with the metal wire Wn via the conductive contact portion C. A plurality of transparent electrodes E2 with a predetermined interval acting as the pixel electrode Px, y are formed on the interlayer insulating layer 35 and covered by the electrode cladding layer 36. The transparent electrode E2 is connected to the second source electrode pad Sb via the conductive column p. With this structure, when the pixel is driven, electric field lines generated from the plurality of transparent electrodes E2 of the pixel electrode Px, y will pass through the interval therebetween and reach the common electrode Sn. The cross section of the pixel shown in FIG. 3B can be compared with the cross section of the panel shown in FIG. 1. The transparent electrode E1 (the common electrode Sn) can be compared to the common electrode 133 shown in FIG. 1. The interlayer insulating layer 35 can be compared to the dielectric layer 132 shown in FIG. 1. The transparent electrode E2 (the pixel electrode Px,y) can be compared to the pixel electrode 131 shown in FIG. 1. The electrode cladding layer 36 can be compared to the alignment layer 134 shown in FIG. 1. The gate dielectric layer 31, the gate cladding layer 32, and the interlayer insulating layers 34 and 35 can be made of material chosen from silicon dioxide, silicon nitride, silicon oxynitride, and the combination thereof. The interlayer insulating layer 33 acting a planarization layer can include insulating material, such as perfluoroalkoxy (PFA) polymer resin. The electrode cladding layer 36 can be organic polymer, for example polyimide (PI).

In the panel manufacturing process, particles such as dust may drop into between two adjacent common electrode blocks Sn or two adjacent metal wires Wn and cause short circuit. Therefore, a short circuit test on the common electrode blocks Sn must be performed before the control chip IC is formed on the panel to prevent from the situation of short circuit.

Figure 4:
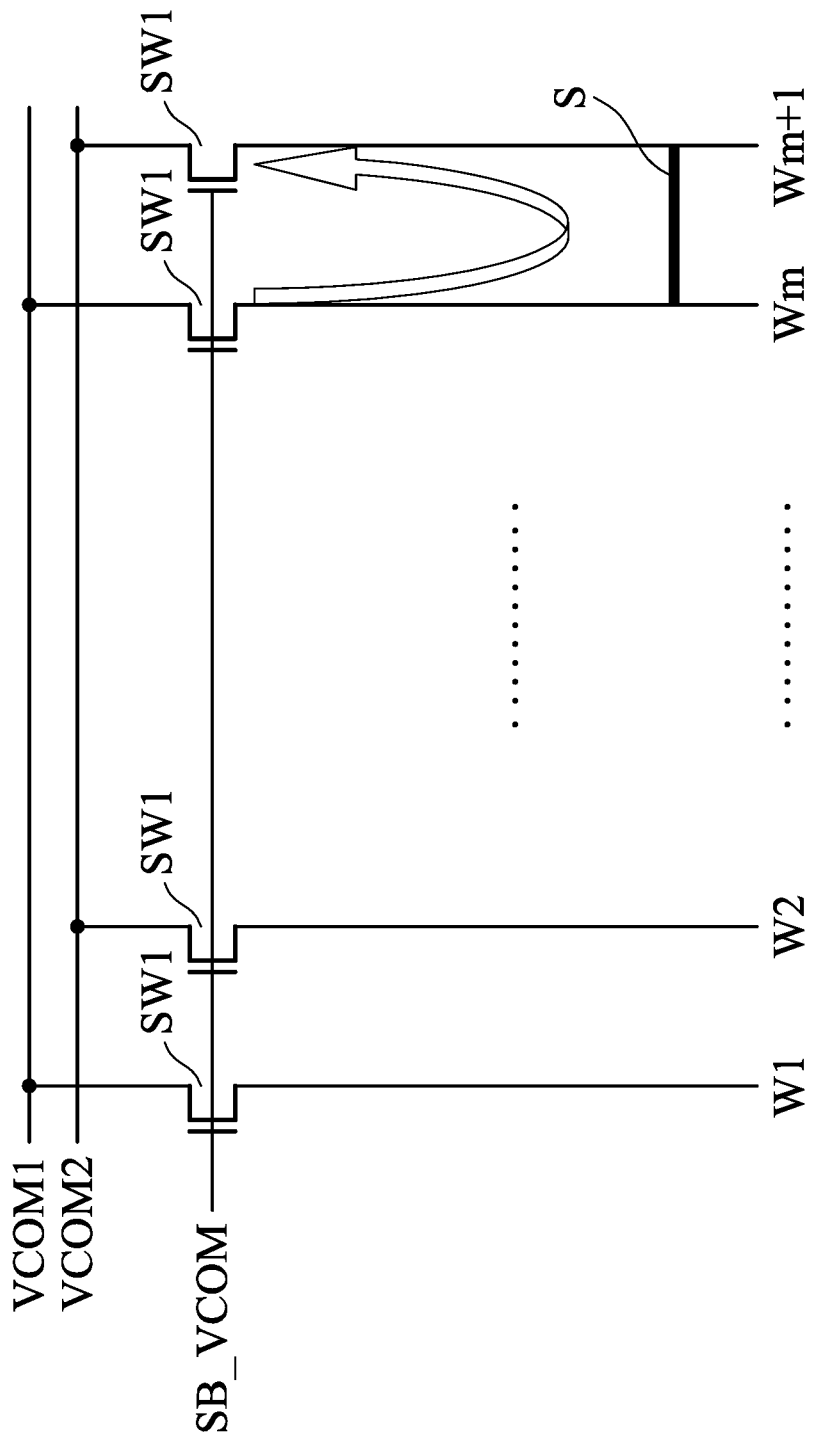
FIG. 4 is a diagram showing a common electrode short circuit test circuit in accordance with an embodiment of the invention.

FIG. 4 is a diagram showing a common electrode short circuit test circuit in accordance with an embodiment of the invention. FIG. 5 is a diagram showing the short test result. To detect whether there is a short circuit between two adjacent common electrode blocks Sn or two adjacent metal wires Wn, the invention makes two adjacent metal wires Wn respectively coupled to different voltage levels. Specifically, the odd metal wire Wn is coupled to the voltage level VCOM1, and the even metal wire Wn is coupled to the voltage level VCOM2. There is a switch element SW1 disposed between each metal wire Wn and one of the voltage levels VCOM1 and VCOM2. The control terminals of all switch elements SW1 are unitedly controlled by one control signal SB_VCOM, so that connection/non-connection between each metal wire Wn and one of the voltage levels VCOM1 and VCOM2 can be controlled. In the common electrode short circuit test, all pixel electrodes Px,y are charged to the highest gray level voltage through the data lines Dy, and the control signal SB_VCOM turns on all switch element SW1 to make the odd metal wires Wn coupled to the voltage level VCOM1 and the even metal wires Wn coupled to the voltage level VCOM2. Therefore, the adjacent common electrode blocks Sn (for example the common electrode blocks S1 an S2 adjacent in the column direction, or the common electrode blocks S1 and Sl+1 adjacent in the row direction) receive different voltage levels VCOM1 and VCOM2. If two adjacent metal wires Wm and Wm+1 as shown in FIG. 4 are short, a current will generate between the metal wires Wm and Wm+1, which flows from one of the voltage levels VCOM1 and VCOM 2 having a higher voltage level to the other of the voltage levels VCOM1 and VCOM 2 having a lower voltage level (for example, the arrow direction). Thus, the common electrode blocks Sm connected with the metal wire Wm and the common electrode blocks Sm+1 connected with the metal wire Wm+1 have the same voltage level.

Figure 5B:
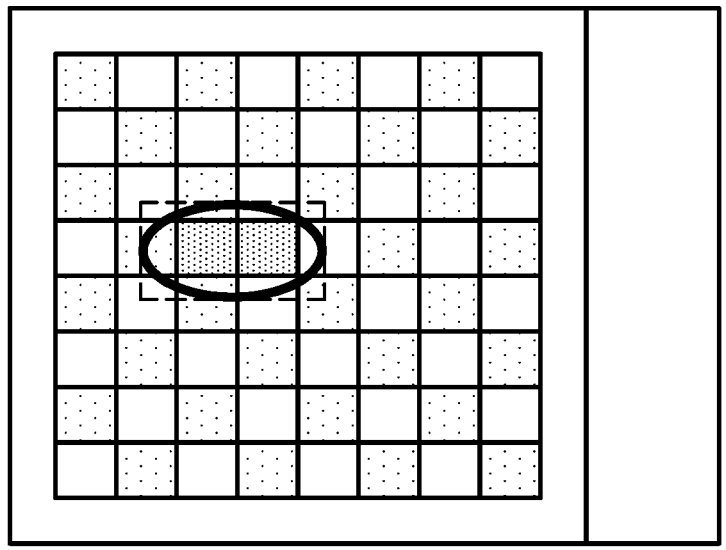
FIG. 5B is a diagram showing that the short circuit test result is "a short circuit existed"
Figure 5A:
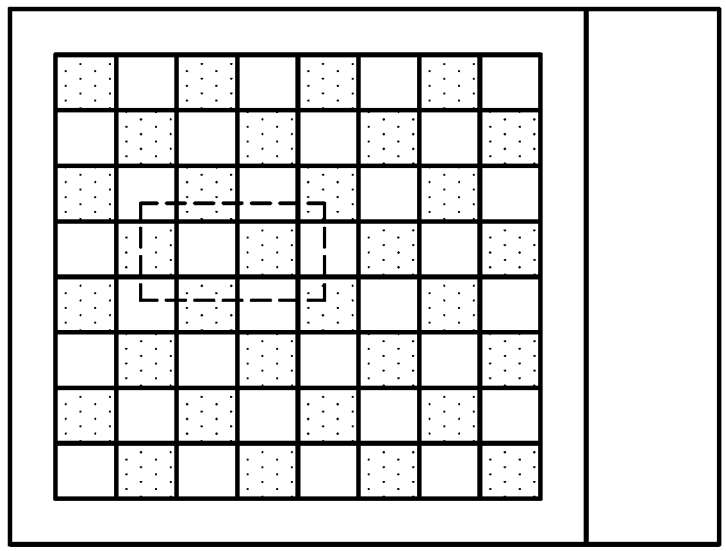
FIG. 5A is a diagram showing that the short circuit test result is "normal"

The result of the common electrode short circuit test is shown in FIG. 5. Because the adjacent common electrode blocks Sn are coupled to different voltage levels VCOM1 and VCOM2, when all pixel electrodes Px, y are charged to the highest gray level voltage, the displayed image will show a checkerboard pattern. Each check corresponds to a common electrode block Sn, and the adjacent blocks show different gray levels. If there are no defections in the checkerboard pattern as shown in FIG. 5a, the test result is "normal." If there are any two adjacent checks showing the same gray level in the checkerboard pattern as the portion circled shown in FIG. 5b, it means that there is a short circuit between the common electrode blocks Sn or the metal wires Wn that correspond to the two checks. In this case, a detail checking should be performed in the area where the short circuit exists to remove the short circuit situation.

Figure 6:
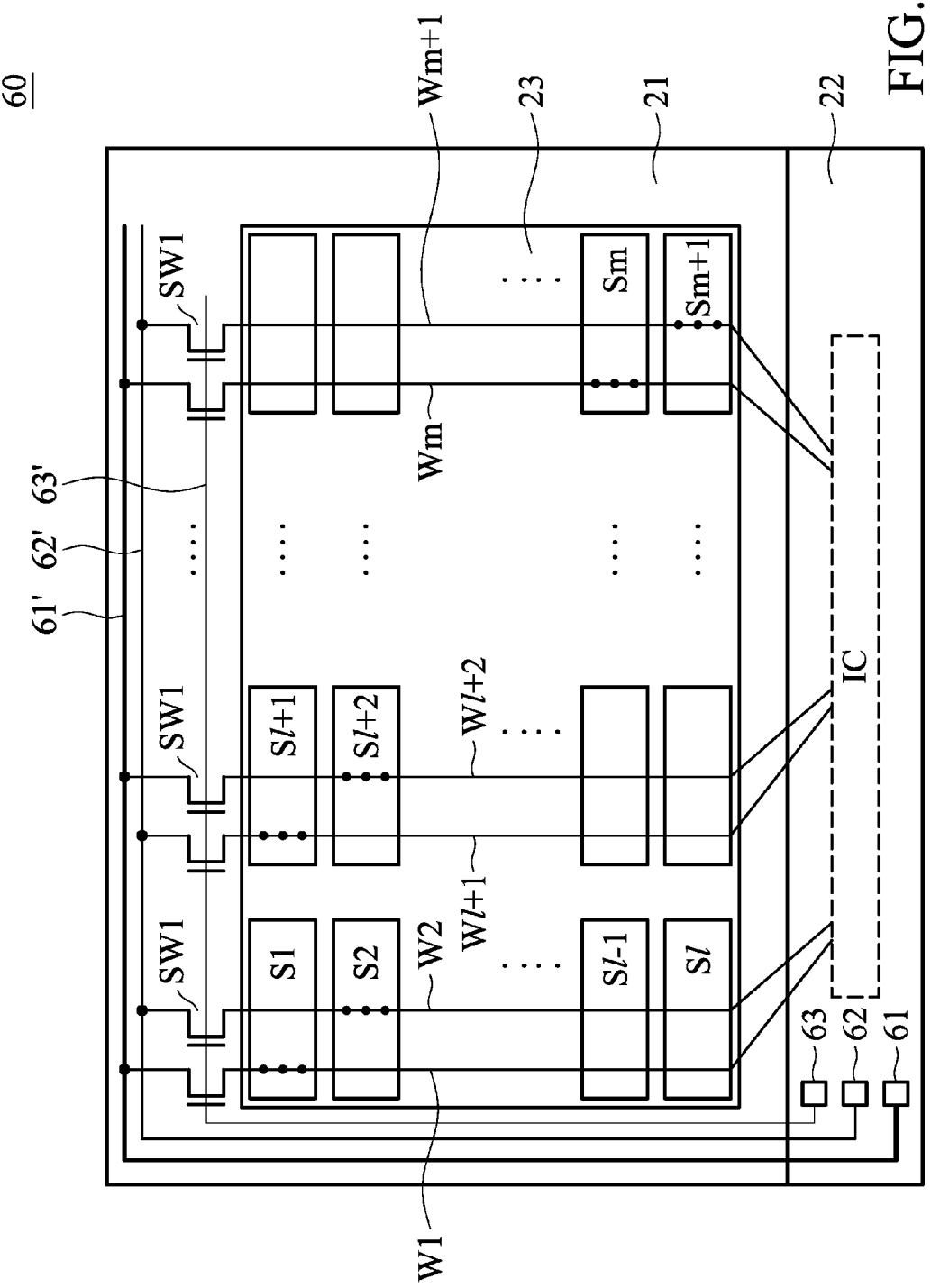
FIG. 6 is a top view of a touch display panel in accordance with an embodiment of the invention.
Figure 7:
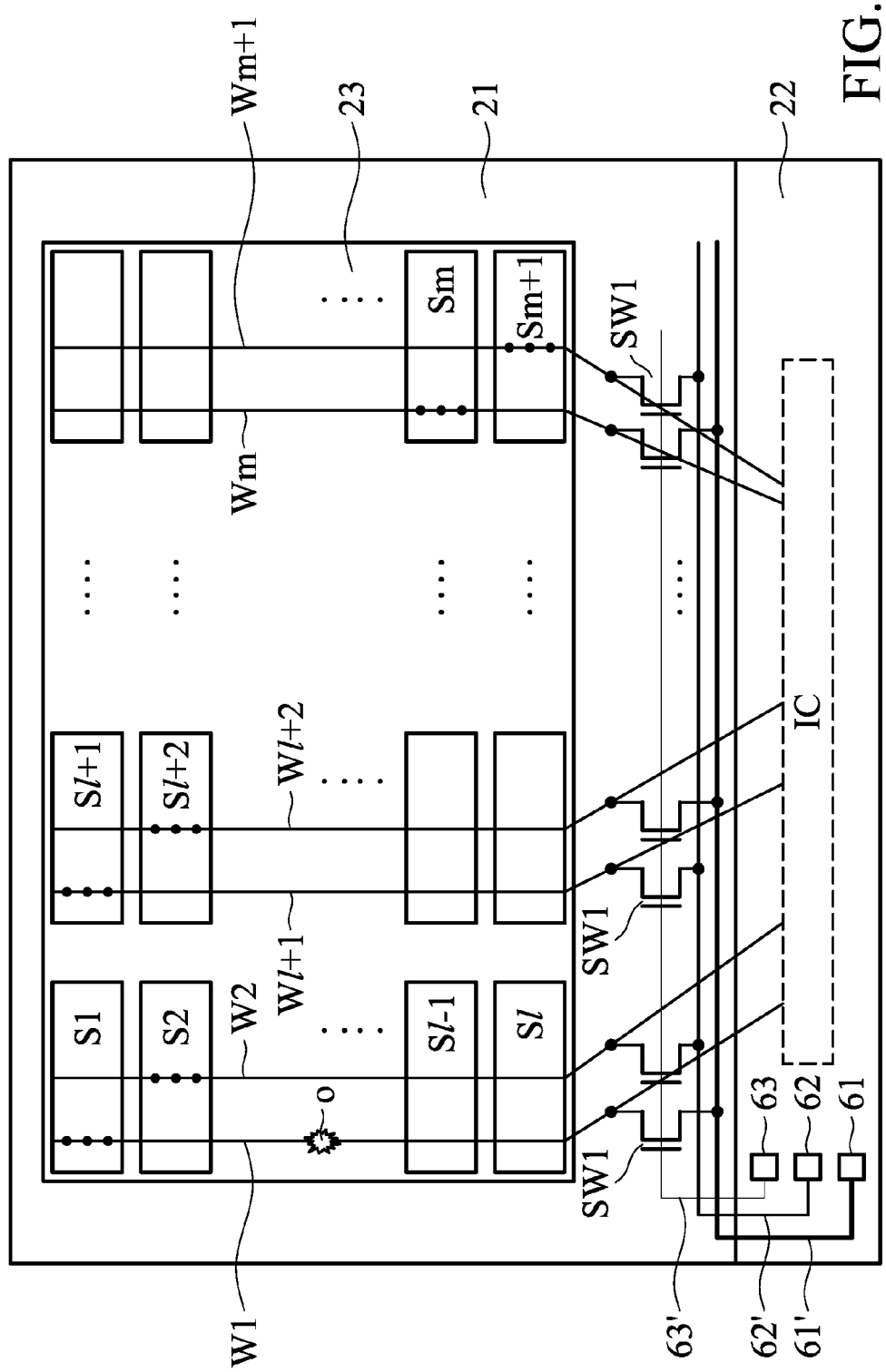
FIG. 7 is a top view of a touch display panel in accordance with another embodiment of the invention.
Figure 8:
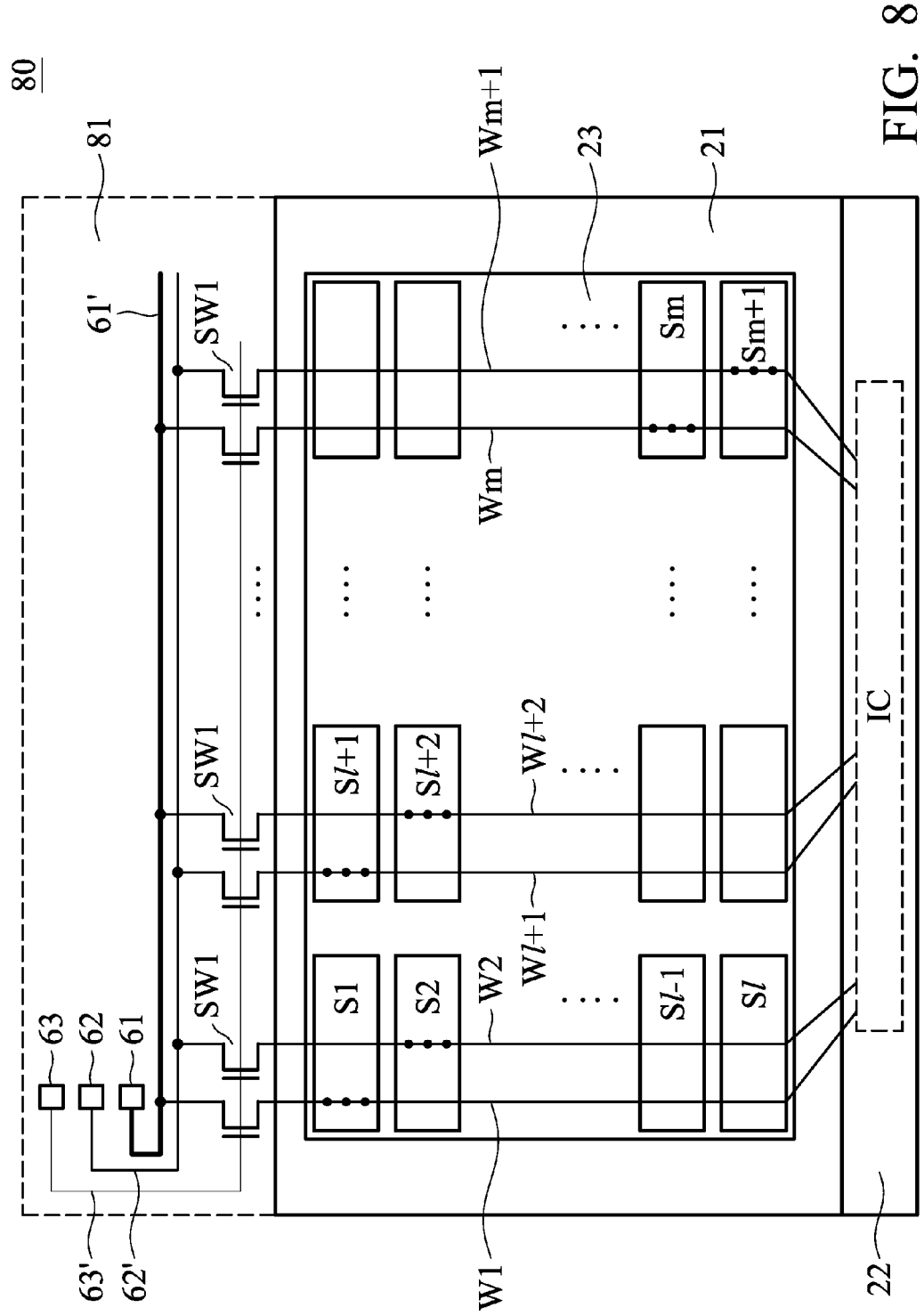
FIG. 8 is a top view of a touch display panel in accordance with another embodiment of the invention.

When the circuit shown in FIG. 4 is disposed on the touch display panel shown in FIG. 2, there are several examples are shown in FIGS. 6-8. Because the control chip IC has not been bonded yet when the common electrode short circuit test is performed, the control chip IC is represented by a dash line. In FIG. 6, a test pad 61, a test pad 62, and a control pad 63 are disposed on the OLB area 22 of the lower substrate of the touch display panel 60. The test pad 61, the test pad 62, and the control pad 63 are respectively connected with a metal wire 61', a metal wire 62', and a metal wire 63'. The three metal wires 61', 62', and 63' extend along the edge of the display area 23 and reach the top edge of the overlap area 21. The switch elements SW1 are disposed adjacent to the top boundary area of the overlap area 21, and one of the switch elements SW1 is connected between the metal wire 61' and one of the odd metal wires Wn or between the metal wire 62' and one of the even metal wires Wn. The control terminals of all switch elements SW1 are connected to the metal wire 63'. When the common electrode short circuit test is performed, the test pad 61 is supplied with the voltage level VCOM1, the test pad 62 is supplied with the voltage level VCOM2, and the test pad 63 is supplied with the control signal SB_VCOM. In this way, the voltage level of the control signal SB_VCOM turns on all switch elements SW1 to accomplish the common electrode short circuit test.

Another example of the test circuit disposed on the touch display panel is shown in FIG. 7. The metal wires 61', 62', and 63' and the switch elements SW1 of the touch display panel 70 are all disposed adjacent to the bottom boundary area of the overlap area 21. This structure can not only perform the same common electrode short circuit test as shown in FIG. 6, but also perform an open circuit test on each metal wire Wn connected to a common electrode block Sn. Before the common electrode open circuit test is performed, a display test is performed in advance. Specifically, all pixel electrodes Px,y are charged by the same gray level voltage through the data lines Dy, and all common electrode block Sn are supplied with the same voltage (the test pad 61 and 62 are supplied with the same voltage level). Then the displayed image is checked by the human eye if there is bright point or dark point to determine if any abnormal pixel exists. The special feature of the structure shown in FIG. 7 is that the open circuit test to each metal wire Wn connected to a common electrode block Sn can be also performed during the display test. If an open circuit occurs on the metal wire W1 as shown in FIG. 7, the voltage level of the common electrode block 51 will be different from the voltage level of the other common electrode blocks. Thus, a check with abnormal gray level can be observed on the displayed image. This check corresponds to the common electrode block S1, so whether or not the metal wire W1 connected to the common electrode block S1 has an open circuit can be determined.

Another example of the test circuit disposed on the touch display panel is shown in FIG. 8. The test pads 61 and 62, the control pad 63, the metal wires 61', 62', and 63', and the switching elements SW1 are all disposed on a redundant area 81 outside the touch display panel 80. The metal wires Wn extend to the redundant area 81 outside the touch display panel 80. The redundant area 81 could be a part of the lower substrate and cut off after the common electrode short circuit test is finished. Therefore, after the redundant area 81 is cut off, only that the metal wires Wn extend to the edge of the substrate can be observed from the appearance of the touch display panel 80. In another embodiment, the metal wires Wn between the switching elements SW1 and the common electrode blocks Sn can be cut by laser. For example, in FIG. 8, a laser beam is moved along a cutting line (in FIG. 8, the solid line that is located between the redundant area 81 and the overlap area 21) to cut off the redundant area 81, and the common electrode blocks Sn are isolated from the switching elements SW1.

After the display test, the common electrode open circuit test, and the common electrode short circuit test, if there are no defects, the touch display panel can be sent to the assembly process. However, there may be residual charges in the touch display panel after a number of tests. If residual charges stay on the pixel electrode for a long time, liquid-crystal molecules could be polarized and damaging the touch display panel. Therefore, the invention further improves the circuit of FIG. 4 to provide a function of discharging pixel electrodes.

Figure 9:
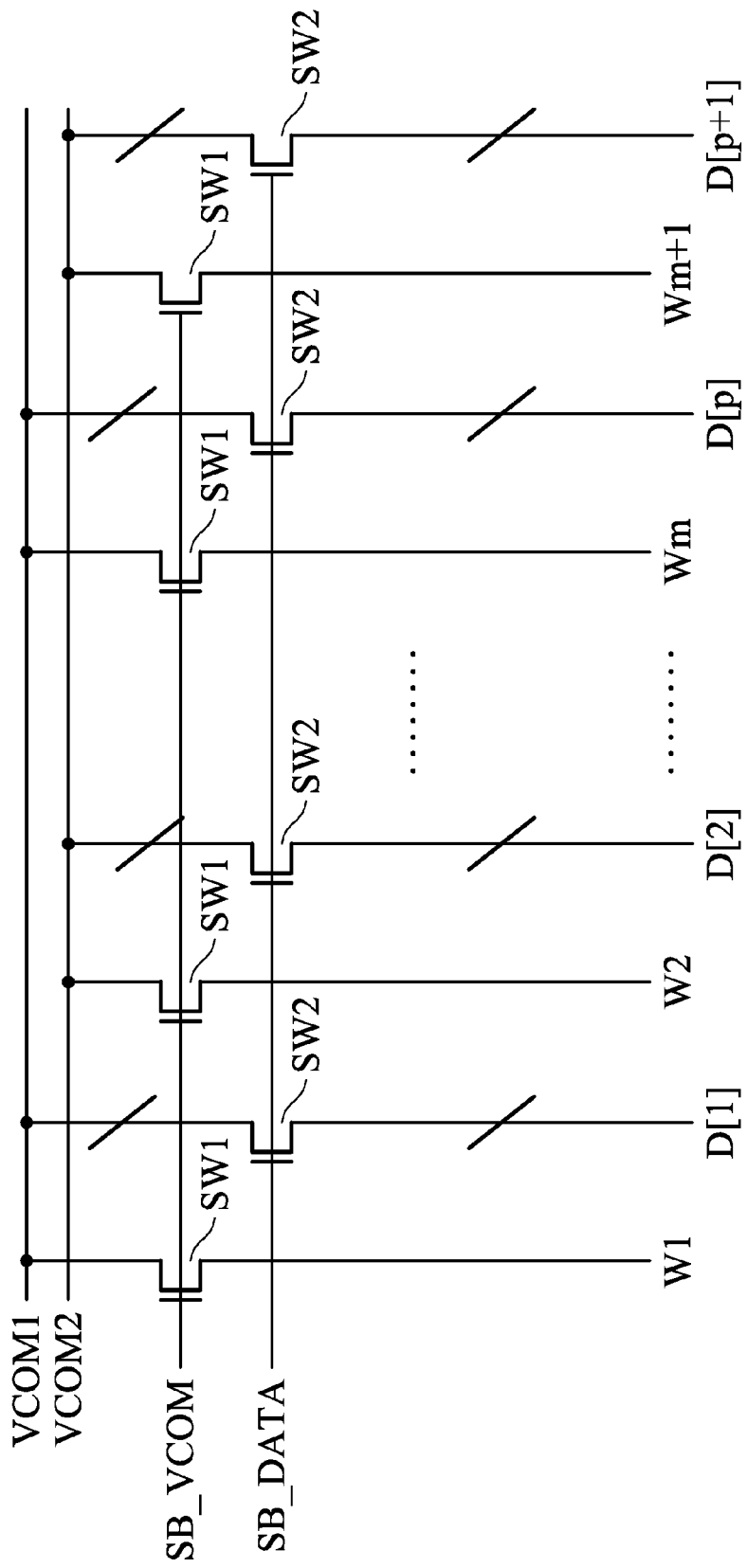
FIG. 9 is a diagram showing a pixel electrode discharge circuit in accordance with an embodiment of the invention.

FIG. 9 is a diagram showing a pixel electrode discharge circuit in accordance with an embodiment of the invention. In FIG. 9, in addition to the circuit of FIG. 4, the data line group D[1], D[2], D[p], and D[p+1] are also connected to the metal wire providing the voltage level VCOM1 or VCOM2 via the switch elements SW2. The control terminals of all switch elements SW2 are unitedly controlled by one control signal SB_DATA, so that connection/non-connection between each data line group and one of the voltage levels VCOM1 and VCOM2 can be controlled. Note that the symbol D[n] (n is a positive integer) represents a group including at least a data line rather than just one data line. Further, FIG. 9 shows the data line group D[1] is connected to the metal wire providing voltage level VCOM1 via one of the switch elements SW2, and the data line group D[2] is connected to the metal wire providing voltage level VCOM2 via one of the switch elements SW2, but in another embodiment, the data line groups D[1] and D[2] can also be connected to the same metal wire. The reason is that the voltage level VCOM1 equals the voltage level VCOM2 during the period the pixel electrodes are discharged. Thus the data line group can be connected any one of the metal wire providing voltage level VCOM1 and the metal wire providing voltage level VCOM2. When the pixel electrodes are discharged, all gate lines Gx turn on the corresponding thin film transistors, and the control signals SB_VCOM and SV_DATA make all the switch elements SW1 and SW2 conductive separately. Thus, the all common electrode blocks Sn and all data lines Dy are coupled to the voltage level VCOM1 or VCOM2. Because the voltage level VCOM1 equals the voltage level VCOM2 at this time, the voltage level of the all data lines Dy equals the voltage level of the all common electrode blocks Sn, so as to discharge the residual charges on the pixel electrodes.

The circuit of FIG. 9 can be disposed on the touch display panel of FIG. 2 in the manner of one of the three arrangements shown in FIGS. 6-8. In this case, the newly added elements includes the switch elements SW2 and a control pad (not shown) disposed adjacent to the control pad 63 to provide the control signal SB_DATA to the control terminals of all switch elements SW2. Except for the above difference, the other features of the touch display panel provided with the circuit of FIG. 9 are the same as the embodiments of FIGS. 6-8, so the detailed description is not repeated again.

Figure 10:
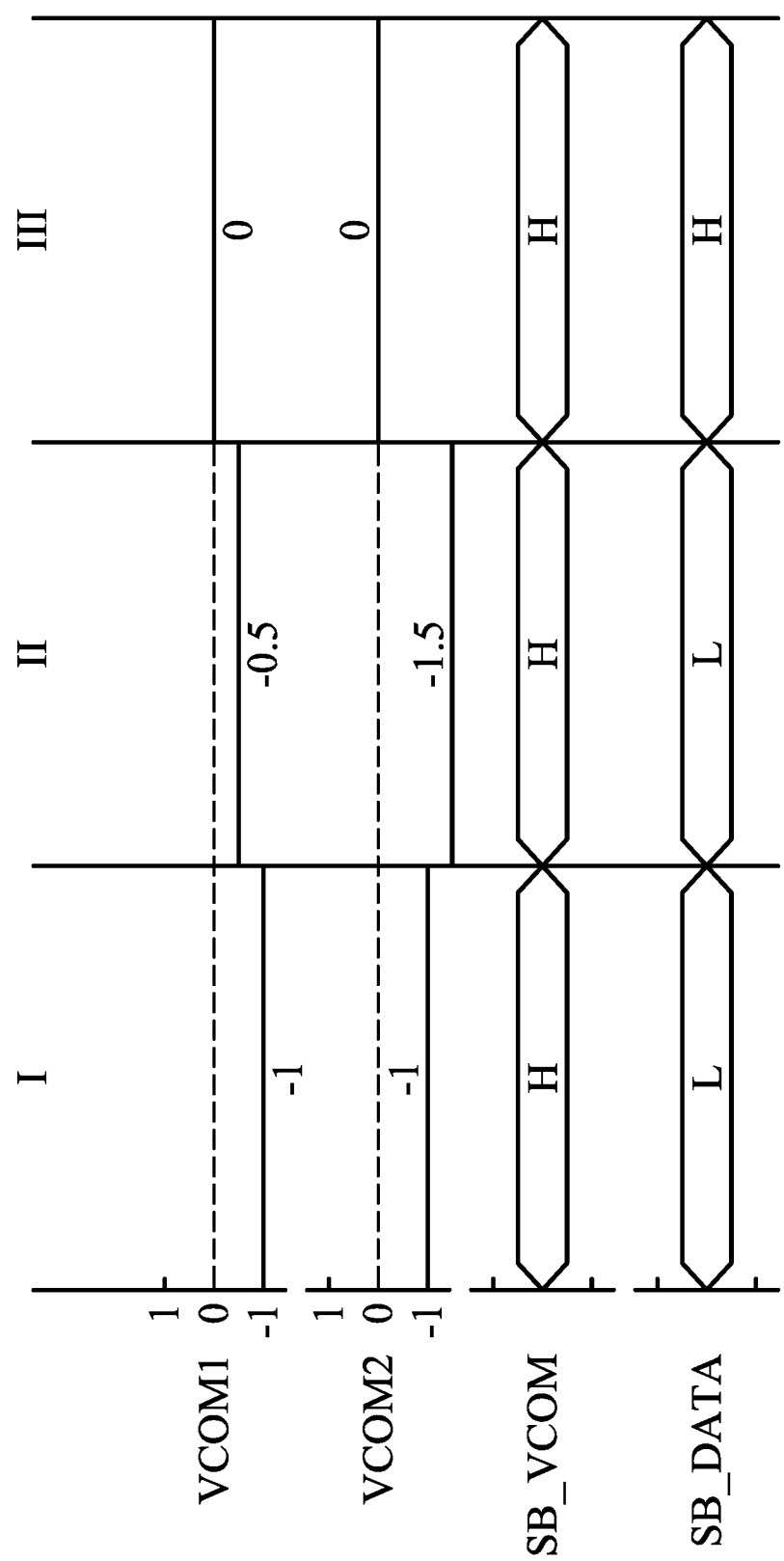
FIG. 10 is a diagram of an example showing the variation of operating voltages when the circuit of FIG. 9 is operated in a display test mode, a common electrode short circuit test mode, and a pixel electrode discharge mode.

When the touch display panel of the invention adopts the circuit of FIG. 9, three modes can be performed: the display test mode, the common electrode short circuit test mode, and the pixel electrode discharge mode. Following, the variation of the voltage levels VCOM1, VCOM2, the control signals SB_VCOM, and SB_DATA when the three modes are performed. FIG. 10 is a diagram of an example showing the variation of operating voltages when the circuit of FIG. 9 is operated in the display test mode, the common electrode short circuit test mode, and the pixel electrode discharge mode. In the example of FIG. 10, the touch display panel is operated under the display test mode I, the common electrode short circuit test mode II, and the pixel electrode discharge mode III in sequence. It is assumed that the switch elements SW1 and SW2 are NMOS transistors that are conductive when the control terminal is supplied with a high voltage level. As shown in FIG. 10, when the touch display panel is operated under the display test mode I, the voltage level VCOM1 equals the voltage level VCOM2 (for example, −1V), the control signal SB_VCOM is high level H that turn on the switch element SW1, and the control signal SB_DATA is low level L that turn off switch element SW2, so as to check whether there are any bright/dark point or abnormal area on the displayed image. When the touch display panel is operated under the common electrode short circuit test mode II, the voltage level VCOM1 isn't equal to the voltage level VCOM2 (for example, the voltage level VCOM1 is −0.5V and the voltage level VCOM2 is −1.5V), the control signal SB_VCOM is high level H that turns on the switch element SW1, and the control signal SB_DATA is low level L that turns off switch element SW2, so as to show a checkerboard image and check whether there are any adjacent checks having the same gray level. When the touch display panel is operated under the pixel electrode discharge mode III, the voltage level VCOM1 equals the voltage level VCOM2 (for example, 0V), the control signal SB_VCOM is high level H that turns on the switch element SW1, and the control signal SB_DATA is high level H that turns on switch element SW2, so that all common electrode blocks Sn and pixel electrodes Px,y have the same voltage level. The residual charges in the pixel electrodes Px,y are discharged via the data lines Dy and the switch elements SW2. (It is assumed that the voltage levels VCOM1 and VCOM2 are grounded).

From FIG. 10, it is understood that the touch panel provided with the circuit of FIG. 9 can be operated in three modes. However, the aforementioned operating voltages are described for an example. The invention is not limited thereto. The switch elements SW1 and SW2 of the invention can be PMOS transistors that are conductive when the control terminal is supplied with a low voltage level.

According to the embodiments, the invention provides a touch display panel and a test method thereof capable of testing whether common electrode blocks are short-circuited or open-circuited and discharging pixel electrodes.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A touch display panel, comprising:
a lower substrate where a common electrode layer, a first test pad, and a second test pad are formed,
an upper substrate disposed above the common electrode layer,
a liquid crystal layer sandwiched between the upper substrate and the lower substrate,
wherein the common electrode layer is divided into a plurality of common electrode blocks, every two of the plurality of common electrode blocks which are adjacent in a row direction are coupled to the first test pad and the second test pad, respectively, and every two of the plurality of common electrode blocks which are adjacent in a column direction are coupled to the first test pad and the second test pad, respectively.

2. The touch display panel as claimed in claim 1, wherein the plurality of common electrode blocks are arranged in a matrix.

3. The touch display panel as claimed in claim 1, wherein a first control pad and a plurality of first switch elements are formed on the lower substrate,
wherein at least one of the plurality of first switch elements is coupled between one of the common electrode blocks and one of the first test pad and the second test pad, and
the first control pad is connected to control terminals of the plurality of first switch elements.

4. The touch display panel as claimed in claim 3, wherein a plurality of data lines, a second control pad and a plurality of second switch elements are formed on the lower substrate,
wherein at least one of the plurality of data lines is connected to one of the first test pad and the second test pad via one of the plurality of second switch elements, and
the second control pad is connected to control terminals of the plurality of second switch elements.

5. The touch display panel as claimed in claim 3, wherein an area of the lower substrate protrudes with respect to an edge of the upper substrate, and
the first test pad, the second test pad, and the first control pad are formed on the area of the lower substrate.

6. The touch display panel as claimed in claim 1, wherein the common electrode block is a quadrilateral and the length of each side of the quadrilateral is 1 mm~5 mm.

7. The touch display panel as claimed in claim 1, wherein the upper substrate is a color filter substrate and the lower substrate is a thin film transistor substrate.

8. A touch display panel, comprising:
a lower substrate where a common electrode layer is formed,
an upper substrate disposed above the common electrode layer,
a liquid crystal layer sandwiched between the upper substrate and the lower substrate,
wherein the common electrode layer is divided into a plurality of common electrode blocks in a matrix, and each of the plurality of common electrode blocks is separately coupled to a metal wire extending to an edge of the lower substrate,
the metal wires coupled to every two of the plurality of common electrode blocks adjacent in a row direction are different wires, and the metal wires coupled to every two of the plurality of common electrode blocks adjacent in a column direction are different wires.

9. A test method of a touch display panel, the touch display panel comprising: a plurality of pixel electrodes, a plurality of common electrode blocks, a first test pad, and a second test pad, wherein any two adjacent common electrode blocks of the plurality of common electrode blocks are separately coupled to the first test pad and the second test pad,
wherein the test method is a common electrode short circuit test method comprising:
charging the plurality of pixel electrodes to the same voltage level,
providing a first voltage level to the first test pad and a second voltage level not equal to the first voltage level to the second test pad so as to make the touch display panel show checkerboard pattern, and
checking whether there are any two adjacent checks showing the same gray level in the checkerboard pattern.

10. The test method as claimed in claim 9, wherein the touch display panel comprises: a first control pad and a plurality of first switch elements, wherein anyone of the plurality of first switch elements is coupled between one of the common electrode blocks and one of the first test pad and the second test pad, and the first control pad is connected to control terminals of the plurality of first switch elements, and wherein the common electrode short circuit test method comprises:

providing a predetermined voltage level to the first control pad to turn on the plurality of first switch elements.

11. The test method as claimed in claim 9, wherein the touch display panel comprises: a plurality of data lines, a second control pad, and a plurality of second switch elements, wherein anyone of the plurality of data lines is connected to one of the first test pad and the second test pad via one of the plurality of the second switch elements, and the second control pad is connected to control terminals of the plurality of second switch elements, wherein the test method is a discharge method comprising:

conducting the plurality of pixel electrodes with the plurality of data lines, providing a third voltage level to the first test pad and the test pad, and providing a predetermined voltage level to the first control pad and the second control pad to turn on the plurality of first switch elements and the plurality of second switch elements to discharge the plurality of pixel electrodes.

12. The test method as claimed in claim 9, wherein the test method is a common electrode open circuit test method comprising:

charging the plurality of pixel electrodes to the same voltage level, providing a fourth voltage level to the first test pad and the second test pad so as to make the touch display panel show an image with the same gray level, and checking whether there is any area with an abnormal gray level on the image.

\* \* \* \* \*